2 Sheets--Sheet 1.

O. KROMER.
Balanced Slide-Valves for Steam-Engines.

No. 146,915. Patented Jan. 27, 1874.

ATTEST:
H. F. Eberts
A. Sprague

INVENTOR:
Otto Kromer
per Attorney
Thos. S. Sprague

2 Sheets--Sheet 2.

O. KROMER.
Balanced Slide-Valves for Steam-Engines.

No. 146,915. Patented Jan. 27, 1874.

ATTEST:
H. F. Eberts
N. J. Sprague

INVENTOR:
Otto Kromer
per Attorney
Thos. S. Sprague

UNITED STATES PATENT OFFICE.

OTTO KROMER, OF SANDUSKY, OHIO.

IMPROVEMENT IN BALANCED SLIDE-VALVES FOR STEAM-ENGINES.

Specification forming part of Letters Patent No. 146,915, dated January 27, 1874; application filed September 15, 1873.

CASE B.

*To all whom it may concern:*

Be it known that I, OTTO KROMER, of Sandusky, in the county of Erie and State of Ohio, have invented certain Improvements in Balanced Slide-Valves for Steam-Engines, of which the following is a specification:

The nature of this invention relates to an improvement in steam-engines of the slide-valve variety, having for its object to so construct the valve as that it shall be nearly balanced, moving upon its seat with a co-efficient of friction but little greater than is due to its weight, such friction being borne by gibs interposed between the valve and shoulders upon its seat. The invention consists in a saddle-shaped valve fitted over a double-faced valve-seat of corresponding form, having openings or ports on both faces, communicating with the side pipes, the top of the valve having two adjustable gibs interposed between it and flat shoulders upon the top of the seat, permitting the valve to be so adjusted as to bear upon the seat-faces sufficiently to work steam-tight, the remaining stress being borne by the said gibs. In engines having automatic expansion-gear, and fitted with independent induction and eduction valves, the seats may be V-shaped and hollow, with ports in their inner faces, between which plays a cast-iron V-shaped valve, having corresponding ports, and a flange at each side projecting over the top edges of the seat, between which, however, adjustable gibs are interposed, to take the wear and friction due to the weight of the valve.

Figure 1:
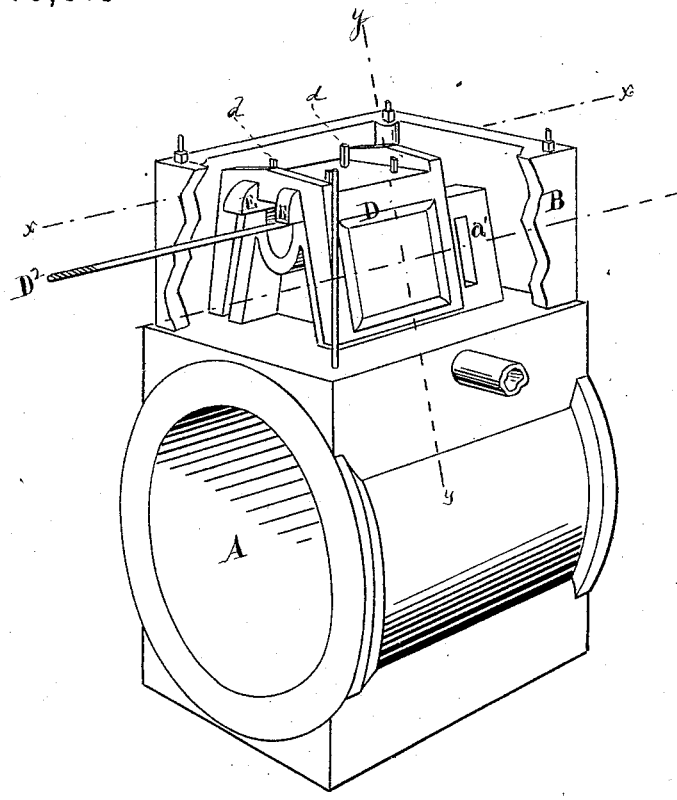
Figure 2:
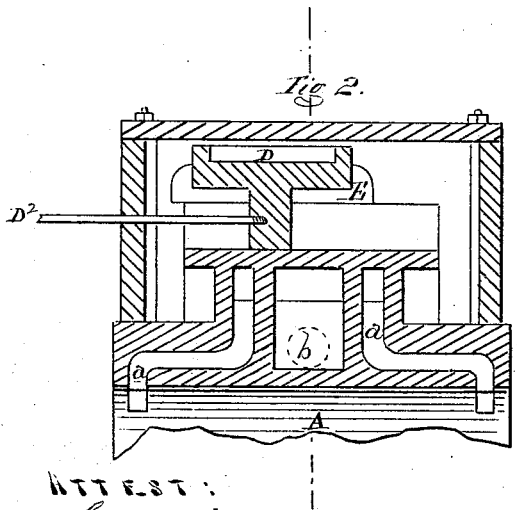
Figure 3:
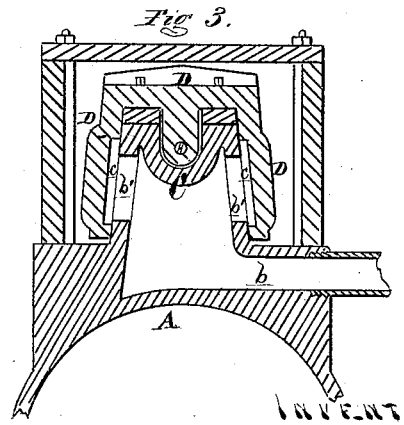
Figure 4:
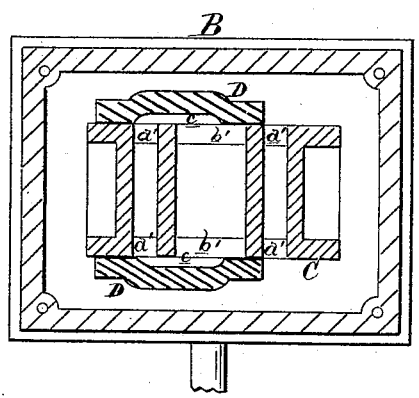
Figure 5:
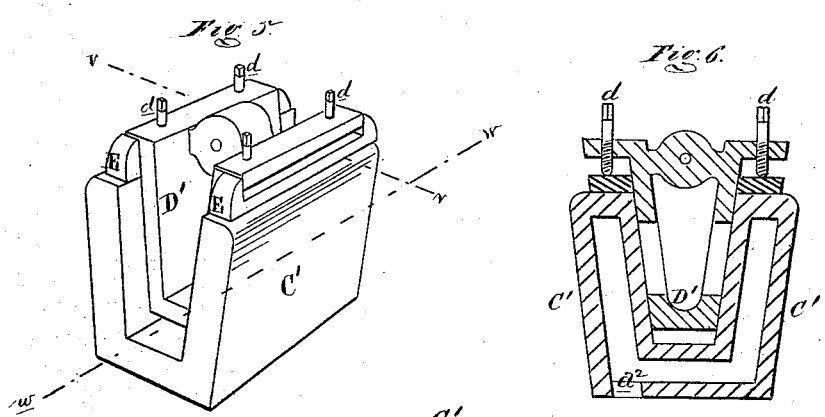
Figure 6:
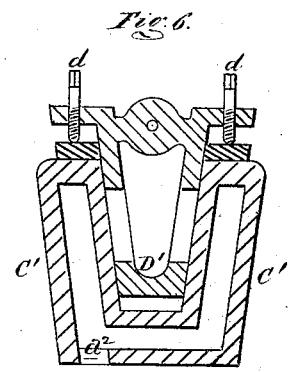
Figure 7:
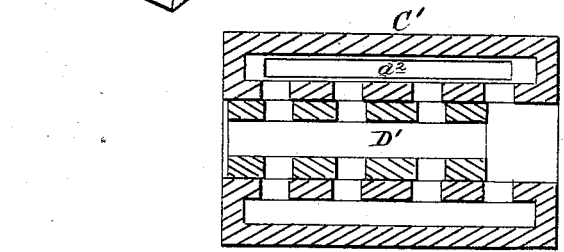

Figure 1 is a perspective view of a horizontal engine fitted with my improved slide-valve, a portion of the steam-chest being broken away to show it. Fig. 2 is a longitudinal vertical section taken on $x\ x$ in Fig. 1. Fig. 3 is a cross-section on the line $y\ y$ in Fig. 2 and Fig. 4, which latter is a horizontal section on the plane $z\ z$ in Figs. 1, 2, and 3. Fig. 5 is a perspective view, showing a modification of the valve and seat, more especially adapted to engines having independent induction and eduction valves. Fig. 6 is a cross-section of the same on $v\ v$ in Fig. 5. Fig. 7 is a horizontal section taken on the plane $w\ w$ in Figs. 5 and 6.

Like letters refer to like parts in the several figures.

In the drawing, A represents the cylinder of a steam-engine, having cored in its top the side pipes or steam-passages $d\ d$ and the exhaust-belt $b$. B is the steam-chest, inclosing the double-faced seat C, which is in the form of a rectangular prismoid, with a longitudinal groove or depression along the middle of the top, to allow the boss on the under surface of the valve D, with which the valve-stem $D^2$ engages, to play freely. On each side or face of the seat is an exhaust-port, $b'$, communicating with the exhaust-belt $b$, and at each side of it a port, $a^1$, communicating with one of the side pipes $a$. The valve D is a saddle-shaped casting, fitted over the seat, with an exhaust-cavity, $c$, molded in the inner face of each of its sides. Between the top of the seat and the under surface of the middle web of the valve are interposed two gibs, E E, with temper-screws $d\ d$, tapped through the back of the valve, to bear upon them, and support the valve in such adjustment with relation to the faces of the seat as that the valve will work steam-tight against them. As the pressure of the steam is exerted upon both sides of the valve, it is evident that the valve is balanced, and the seat relieved from all pressure except that upon the differential area of the top and bottom of the valve, and that due to the weight of the valve. This pressure is carried upon the gibs, which, as they become worn, can have the pressure continued upon them by turning down the temper-screws, so that the valve being properly faced to its seats in the first instance, can be kept so.

When either port in the seat, or rather pair of opposing ports, are disclosed by the valve, to give steam to that end of the cylinder, the other steam-ports are included within the exhaust-recesses of the valve, which thus opens communication with the eduction-pipe for the exhaust steam.

In Fig. 5 is shown a modified form of valve, also cast solid, and more especially intended for engines having independent induction and eduction valves. In this case the valve-seat C' is placed crosswise of the cylinder, and is hollow or chambered, with ports cut through its inner faces, communicating with the cylinder-ports through a port, $a^2$, in its bottom. $D^1$ is a V-shaped valve, fitted to and playing between the faces of the seat, with flanges at its sides projecting over the top sides of the seat, with gibs E interposed. Temper-screws $d\ d$ are tapped through each flange of the valve to transfer its weight and pressure to the gibs, which thus take all the wear, this valve, like the first, being practically balanced. It has as many ports cut through each side, less one, as there are ports in the seat, which insures a quick and full opening with a short throw of the valve.

By making these valves as single castings, they are much stronger and cheaper than valve-plates held asunder by struts and stay-bolts.

What I claim as my invention, and desire to secure by Letters Patent, is—

The saddle-shaped valve D, cast in one piece, and provided with the exhaust-cavities $c$, the gibs E E, and temper-screws $d\ d$, in connection with the double-faced seat C, provided with the ports $a^1\ b'$, substantially as described and shown.

OTTO KROMER.

Witnesses:
AUGUST KLOTZ,
JOS. F. KILBY.